UNITED STATES PATENT OFFICE.

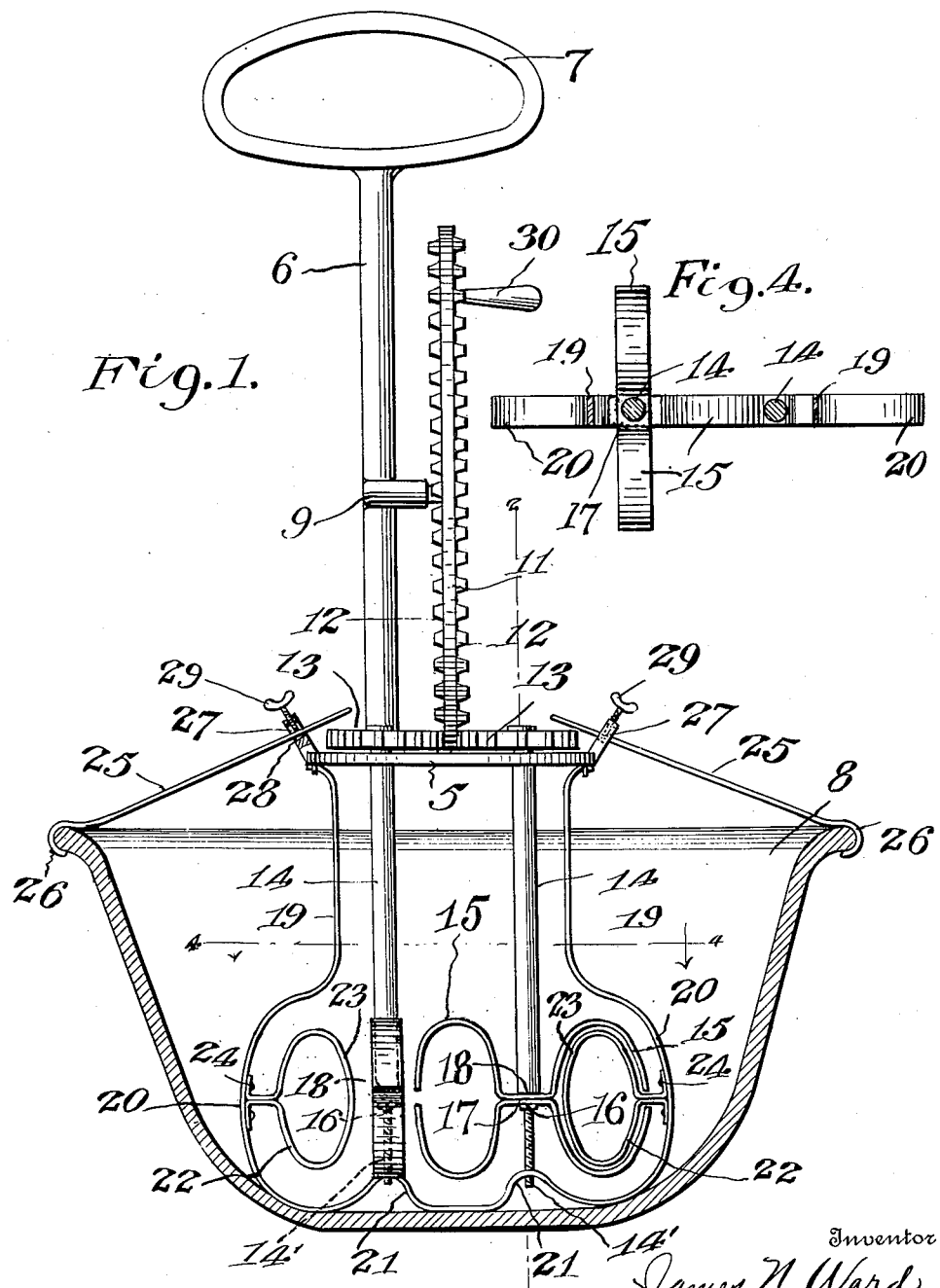

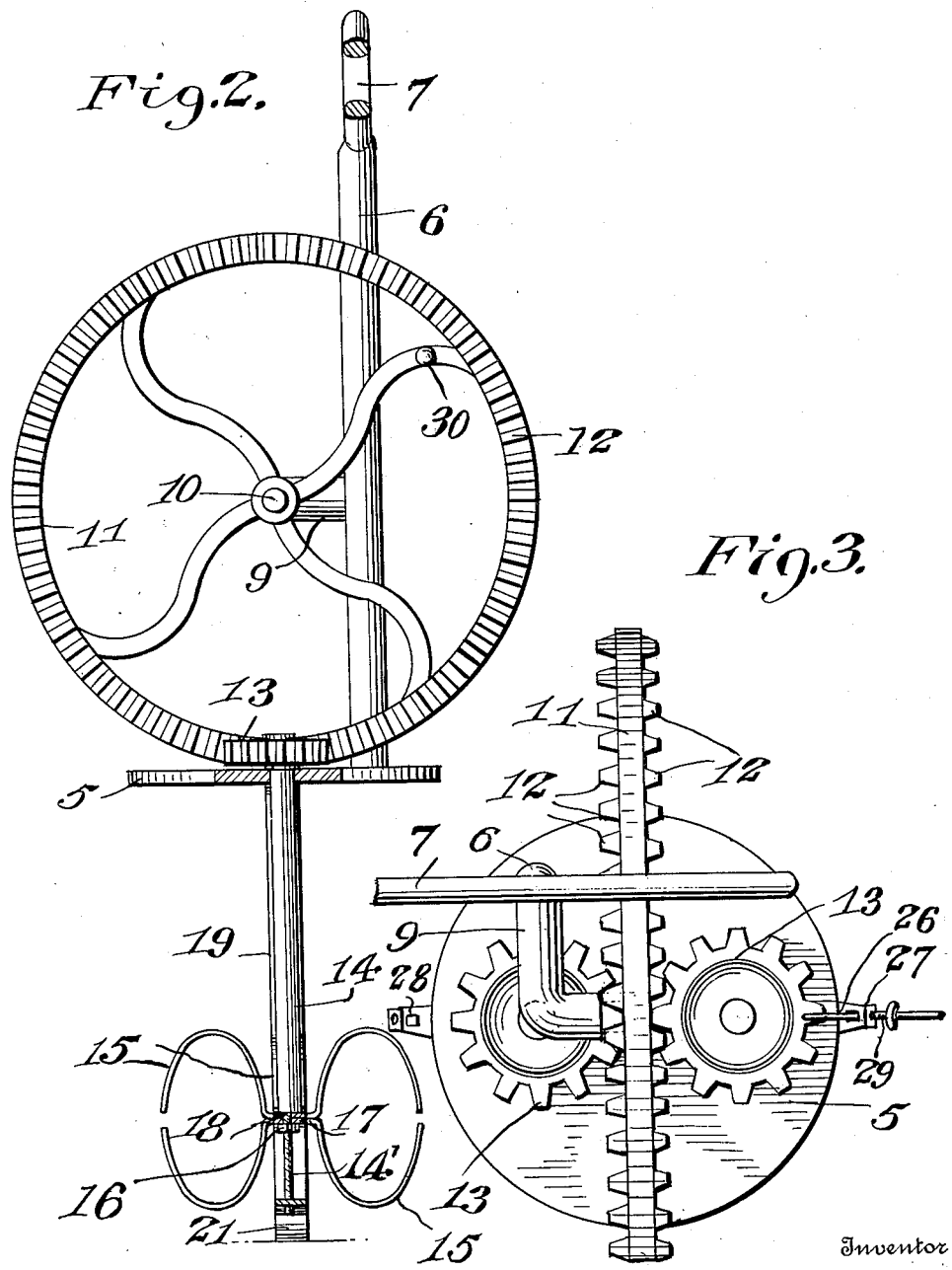

JAMES N. WARD, OF HAVELOCK, NEBRASKA.

EGG-BEATER.

961,272.

Specification of Letters Patent.  Patented June 14, 1910.

Application filed October 14, 1909.  Serial No. 522,643.

*To all whom it may concern:*

Be it known that I, JAMES N. WARD, a citizen of the United States, residing at Havelock, in the county of Lancaster and State of Nebraska, have invented certain new and useful Improvements in Egg-Beaters, of which the following is a specification, reference being had to the accompanying drawing.

This invention relates to certain new and useful improvements in beaters, kneaders, or mixers, and the primary object of the invention resides in the provision of a kitchen utensil of this character which is adapted for use in reducing to uniform consistency liquid or other substances, or for mixing a plurality of substances, said beater being of such construction that the desired result is effected with but little exertion on the part of the operator.

Another object is to provide an egg beater, wherein a plurality of beater members are suitably mounted in a supporting frame, said members carrying pinions which are adapted to be engaged by the teeth of a centrally positioned drive wheel, the beater blades being adapted to coöperate with each other and with suitable stationary members secured to the supporting frame, to churn or agitate the liquid.

A further object is to provide suitable means whereby the beater may be supported within a dish, bowl or other receptacle, thus obviating the necessity of the operator exerting his strength to hold the beater in position during its operation.

With these and other objects in view, the invention consists of the novel construction, combination and arrangement of parts hereinafter fully described and claimed, and illustrated in the accompanying drawing, in which—

Figure 1 is a side elevation of an egg beater constructed in accordance with the present invention, showing the same positioned in a bowl; Fig. 2 is a section taken on the line 2—2 of Fig. 1; Fig. 3 is a top plan view; and Fig. 4 is a section taken on the line 4—4 of Fig. 1.

Referring to the drawings 5 indicates a circular base and 6 a vertical frame bar integrally formed therewith. The upper end of this bar is provided with a suitable handle 7 which may be grasped by the operator to place the beater in position in a bowl or other receptacle 8. An arm 9 is integrally formed with the frame bar 6 and has a hub or sleeve 10 formed upon its outer end in which is journaled a drive wheel 11. As shown in Fig. 1 this wheel is provided on its opposite faces with teeth 12 which mesh with the teeth of the pinions 13 disposed upon the upper surface of the base 5 and secured to the ends of the depending shafts 14. This drive wheel 11 rotates between the pinions 13 and drives the same in opposite directions. The shafts 14 have secured to their lower ends the beater blades 15. These blades are preferably formed of sheet metal strips and may be secured on the shafts 14 in any approved manner. As shown in the drawings, I reduce the lower ends of the shafts 14 as at 14' and provide the same with screw threads to receive the clamping nuts 16. The blades 15 are substantially circular in form each of which is formed from two semi-circular metal strips, and have a connecting portion 17, said connecting portion being provided with an aperture through which the reduced lower extremity of the shaft 14 extends. This construction is clearly shown in Fig. 1 and it will be noted that when the blade sections are secured upon the lower extremities of the shafts 14, the securing nut 16 will hold the connecting portion 17 thereof against the shoulder 18 of the shafts which is formed by reducing their lower ends. Thus vertical movement of the blades upon the shaft is prevented.

A supporting bar 19 has its ends secured to the base 5 at diametrically opposite points, and adjacent to its lower end is laterally extended as shown at 20. The lower horizontal portion of this bar is arched or bent upwardly as at 21 upon opposite sides of the center and directly under the shafts 14. These arched portions are formed with suitable openings to receive the lower reduced ends 14' of the shaft. It will be noted that the base supporting bar 19 is formed of one continuous length of bar metal, preferably steel. To the laterally extended portions 20 of this bar, the inwardly extending stationary members 22 are secured. These members are each formed of a single length of sheet metal which is bent intermediate of its ends to provide a substantially circular portion 23, the extremities of said strip being secured to the bar 20 by means of suitable screws, rivets, or other analogous fastening devices 24. It will be observed that one of the agitating blades 15 which are disposed on opposite sides of each of the shafts 14 is disposed at right angles to the other agitating blade. This is essential to the proper operation of the device as when the shafts are rotated, the blades 15 pass between each other as they move in an opposite direction, while the circular portions 23 of the members 22 pass through each of the agitating blades as they are rotated, thus thoroughly agitating the liquid or mixture in the bowl at the sides of the bowl as well as at its center.
In order to support the beater within the bowl and relieve the operator of the necessity of bearing down upon the handle 7 to hold the beater rigidly in position during its operation, I provide a plurality of brace rods 25, preferably two in number as shown. These rods have their extremities upwardly and then inwardly bent to provide the dish engaging portions 26 which are adapted to engage on the rim or flange of the dish.
These rods extend through the lugs 27 which are integrally formed with and extend at an angle to the base 5. These lugs are each formed with an opening 28 of considerably greater diameter than the brace rods 25, thus allowing the brace rods to be disposed at various angles according to the height of the dish or receptacle 8. The brace rods are securely held against longitudinal movement through the lugs by means of the thumb screws 29 which have binding engagement upon the rods.

The drive wheel 11 may be rotated by means of a suitable handle 30 which is secured to one of the spokes which radiate from the hub 10. From the above description the operation of the beater is self evident. After the device has been positioned in the dish and the brace rods properly secured on the upper edge thereof, the drive wheel is rotated which in turn will rotate the shafts 14 in opposite directions through its engagement with the pinions 13. Thus the beater blades will be rotated within the dish and in passing between each other and over the members 23, the material in the bowl will be thoroughly agitated and quickly reduced to the proper consistency which may be desired. The operation may be completed with a minimum amount of labor upon the part of the operator, and the construction and arrangement of the various elements is such that the greatest possible strength and durability is secured with a minimum expenditure in the cost of production.

While I have shown what I believe to be the preferred embodiment of my invention it will of course be understood that various minor modifications may be resorted to within the scope of the claims without departing from the essential features or sacrificing any of the advantages of the invention.

Having thus described the invention, what is claimed is:

1. In a beater, the combination with a frame and handle, of vertical shafts positioned through said frame, pinions on said shafts, beater blades secured to the lower ends of said shafts, said blades being disposed upon opposite sides of the shafts and each comprising two strips of sheet metal semi-circularly bent in opposite directions and having a central connecting portion, said connecting portions being perforated to receive the lower ends of said shafts, the blades carried by one of the shafts being at right angles to those on the other shaft, securing nuts threaded on said shaft to prevent longitudinal movement of the blades, and a drive wheel meshing with said pinions to rotate the shafts in opposite directions, said blades passing between each other.

2. In a beater, the combination with a supporting base, of a vertical standard integrally formed therewith having a handle at its upper end, depending shafts extending through said base, pinions on said shafts, a supporting bar secured at its ends to said base, said shafts having their lower ends positioned in said bar, substantially circular agitating members carried by said shafts, the members of one shaft being at right angles to those on the other shaft, circular stationary members secured to said bar and extending inwardly therefrom, and a drive wheel meshing with said pinions to rotate the shafts in opposite directions, said agitating members passing between each other and over the stationary members.

3. In an egg beater, the combination with a supporting frame and operating handle, of shafts mounted in said frame, pinions on said shafts, a bar secured at its ends to said frame and depending therefrom, said bar being laterally extended and having an intermediate connecting portion, said shafts having their lower ends disposed in said connecting portion, a plurality of substantially circular agitating members carried by each of said shafts, the members on one shaft being at right angles to those on the other, a sheet metal strip secured at its ends to the laterally extended portion of said bar and having a substantially circular intermediate portion, and a drive wheel meshing with said pinions to rotate the shafts in opposite directions, said members passing between each other and over the circular intermediate portions of said sheet metal strips.

4. In an egg beater, the combination with a supporting base and a vertical standard integrally formed therewith having a handle at its upper end, of vertical shafts extending through said base and depending therefrom, pinions secured to the upper ends of said shafts, a plurality of circular agitating blades secured to the lower end of each of said shafts, a single length of bar metal having its ends secured to said base, said bar having an intermediate horizontal portion and laterally extending portions, a circular member secured to each of said laterally extending portions and extending inwardly therefrom, the agitating members carried by one of the shafts being at right angles to the members carried by the other shaft, means for supporting the beater in operative position, and a drive wheel journaled on said standard, said drive wheel having teeth on its opposite faces adapted to mesh with said pinions to rotate the shafts in opposite directions, the beater members extending between each other during their rotative movement and passing over said circular members.

5. In an egg beater, the combination with a base and a vertical standard integrally formed therewith having a handle at its upper end, of depending shafts extending through said base, pinions on said shafts, agitating members secured to the lower ends of said shafts, brace rods movably secured at one end to said base, said rods having their outer ends removably engaged with a dish or receptacle and adapted to support the beater in operative position, a drive wheel rotatably mounted on said standard, said wheel meshing with the pinions to rotate the shafts in opposite directions, and a bar positioned upon the bottom of the dish out of the circle of movement of the agitating members, said bar having its ends secured to said base, the lower ends of said shafts being journaled in said bar.

6. In an egg beater, the combination with a supporting base and a vertical standard integrally formed therewith, of vertical shafts extending through said base, pinions on said shafts, agitating members secured to the lower ends of said shafts, said members each being formed of resilient sheet metal strips bent into substantially semicircular form and arranged in opposite relation to each other on said shafts, a bar having its ends secured to the base and having a central horizontal connecting portion, the lower ends of the shafts being journaled in said connecting portion, oppositely disposed inwardly extending circular members secured to said bar of smaller diameter than said agitating blades, a plurality of brace rods having their inner ends movably disposed in angularly extending lugs integrally formed with the base, said rods being secured in said lugs by suitable thumb screws, the apertures in said lugs being of larger diameter than the rods, the outer ends of said rods being bent to engage upon the upper circumscribing edge of a dish or other receptacle, a drive wheel having teeth on its opposite faces interposed between the pinions to rotate said shafts in opposite directions, and move the agitating members between each other and over the circular members secured to said bar.

7. In a beater, the combination with a frame, of adjustable detachable supporting members carried by said frame adapted for engagement upon the rim of a dish or other receptacle, vertically disposed shafts mounted in said frame, pinions secured on the upper ends of said shafts, a power gear having oppositely disposed teeth positioned for movement between said pinions to rotate the shafts in opposite directions, agitating members carried by said shafts and removably secured to their lower ends, said members being disposed at right angles to each other and stationary members secured to the supporting frame and extending inwardly therefrom, the agitating members being adapted to pass over said stationary members and between each other.

8. In a beater, the combination with a supporting base, of a frame depending therefrom adapted for engagement upon the bottom of a dish or other receptacle, vertically disposed shafts rotatably mounted in said base, the lower ends of said shafts being journaled in said frame, agitating members removably secured on the lower ends of said shafts, stationary members secured to and extending inwardly from the frame, said agitating members being adapted to pass over the stationary members and through each other, means adjustably carried by the supporting base for removable engagement with the rim of the dish and means for rotating said shafts in opposite directions.

In testimony whereof I hereunto affix my signature in the presence of two witnesses.

JAMES N. WARD.

Witnesses:
 ALICE M. WARD,
 SUSAN ALLPRESS.